United States Patent
Kim et al.

(10) Patent No.: US 12,333,931 B2
(45) Date of Patent: Jun. 17, 2025

(54) APPARATUS AND METHOD FOR ESTABLISHING IR CONTROL CODE DATABASE OF USER TERMINAL

(71) Applicant: OHSUNG ELECTRONICS CO., LTD., Busan (KR)

(72) Inventors: Sang Tae Kim, Daegu (KR); So Young Lee, Gyeongsangbuk-do (KR)

(73) Assignee: OHSUNG ELECTRONICS CO., LTD., Busan (KR)

( * ) Notice: Subject to any disclaimer, the term of this patent is extended or adjusted under 35 U.S.C. 154(b) by 281 days.

(21) Appl. No.: 17/809,942

(22) Filed: Jun. 30, 2022

(65) Prior Publication Data

US 2023/0076373 A1 Mar. 9, 2023

(30) Foreign Application Priority Data

Sep. 9, 2021 (KR) .......................... 10-2021-0120565

(51) Int. Cl.
*G08C 23/04* (2006.01)
*G06F 16/908* (2019.01)

(52) U.S. Cl.
CPC ........... *G08C 23/04* (2013.01); *G06F 16/908* (2019.01); *G08C 2201/20* (2013.01); *G08C 2201/50* (2013.01); *G08C 2201/92* (2013.01)

(58) Field of Classification Search
CPC ............................ G08C 23/04; G08C 2201/20; G08C 2201/50; G08C 2201/92; G06F 16/908; H04N 21/42204; H04N 21/4227
See application file for complete search history.

(56) References Cited

U.S. PATENT DOCUMENTS

| | | | | |
|---|---|---|---|---|
| 7,831,930 B2* | 11/2010 | Dresti | ...................... | H04N 7/16 715/714 |
| 9,679,470 B2* | 6/2017 | Pratt | ...................... | G08C 23/04 |
| 2001/0010503 A1* | 8/2001 | Darbee | .................. | G08C 23/04 340/4.3 |
| 2002/0171762 A1* | 11/2002 | Maxson | .............. | H04L 12/2805 348/706 |
| 2003/0103088 A1* | 6/2003 | Dresti | .................... | G08C 23/04 715/835 |

(Continued)

FOREIGN PATENT DOCUMENTS

KR 20150075827 A * 7/2015

*Primary Examiner* — Adnan Aziz
(74) *Attorney, Agent, or Firm* — Rankin, Hill & Clark LLP

(57) ABSTRACT

An apparatus for establishing an infrared (IR) control code database in a user terminal so as to control various peripheral devices remotely by using the user terminal. An apparatus includes a first interface connected to a first device to perform communication for performing a setting process for controlling a second device, a second interface connected to the second device to perform communication for controlling operation of the second device, and a controller configured to perform control such that when the first device outputs setting screen information for selecting product type and manufacturer information of the second device, the product type and manufacturer information selected by the user is received and transmitted to the first device through the first interface and a control code set for controlling the second device is received from the first device through the first interface to establish an IR control code database in the storage.

7 Claims, 9 Drawing Sheets

(56) References Cited

U.S. PATENT DOCUMENTS

| | | | | |
|---|---|---|---|---|
| 2013/0107131 | A1* | 5/2013 | Barnett | H04B 1/205 348/734 |
| 2014/0139749 | A1* | 5/2014 | Kim | H04B 1/202 348/734 |
| 2014/0188484 | A1* | 7/2014 | Huang | H03J 1/0025 704/275 |
| 2016/0197772 | A1* | 7/2016 | Britt | G08C 17/02 370/254 |
| 2018/0012485 | A1* | 1/2018 | Park | G08C 23/04 |
| 2019/0379887 | A1* | 12/2019 | Marino | H04L 12/2805 |
| 2020/0090499 | A1* | 3/2020 | Kim | G08C 23/04 |
| 2022/0182704 | A1* | 6/2022 | Yin | H04N 21/43635 |

* cited by examiner

APPARATUS AND METHOD FOR ESTABLISHING IR CONTROL CODE DATABASE OF USER TERMINAL

CROSS REFERENCE TO RELATED APPLICATION

The present application claims priority to Korean Patent Application No. 10-2021-0120565, filed Sep. 9, 2021, the entire contents of which is incorporated herein for all purposes by this reference.

FIELD

The present disclosure relates to a remote control apparatus and method for controlling various home appliances remotely. In particular, the present disclosure relates to a method and an apparatus for establishing an infrared (IR) control code database in a user terminal so as to control various peripheral devices remotely by using the user terminal.

DESCRIPTION OF THE RELATED ART

As a remote control apparatus for remotely controlling a set-top box or/and a peripheral device (a display device, an audio device, a home appliance, etc.) connected to a set-top box, a remote control is widely used.

In general, a remote control controls a set-top box or a peripheral device through an IR signal, and an IR blaster means an infrared transmitter for controlling devices that operate in an IR remote control method. In order to control various peripheral devices by using an IR blaster, information, such as a type and manufacturer, of a peripheral device to be controlled needs to be determined in advance, and an IR control command set of a remote control apparatus needs to be preset to be suitable for control of the peripheral device so as to enable control.

Therefore, the remote control apparatus needs to always have, in a storage space thereof, the latest IR database matched to the protocol of the peripheral device to be controlled. However, the types of peripheral devices that the remote control apparatus is able to control are not limited to just display devices, such as TVs, and have expanded to various home appliances, such as refrigerators, washing machines, cooking appliances, lighting devices, air conditioners, etc. As new products of global manufacturers have been continuously released, there is a limitation to the peripheral device items that the remote control apparatus is able to control.

In addition to a dedicated control device such as a remote control, hardware, e.g., an IR interface, for controlling peripheral devices is supported in user terminals, such as smartphones, laptops, and smartpads. However, it is impossible to control the peripheral devices without establishing a control code database for IR control. Accordingly, in order to IR control peripheral devices by using various user terminals, there is a need for a method of establishing an IR database in a user terminal.

The foregoing is intended merely to aid in the understanding of the background of the present disclosure, and is not intended to mean that the present disclosure falls within the purview of the related art that is already known to those skilled in the art.

BRIEF SUMMARY

The present disclosure is directed to providing a method and an apparatus for establishing and setting, in a user terminal, a control code database for controlling various home appliances remotely by using the user terminal.

In addition, the present disclosure is directed to providing a method and an apparatus for setting up infrared (IR) control data in a user terminal so as to control various peripheral devices through the user terminal.

However, the objectives of the present disclosure are not limited to the aforementioned objectives, and other unmentioned objectives will become apparent to those skilled in the art from the following description.

According to an embodiment of the present disclosure, there is provided a method of establishing an IR database of a user terminal, wherein the user terminal is connected to a first device through a first interface and to a second device through a second interface and is configured to control the second device by using an infrared (IR) blaster, the method including: starting, by the first device in a first step, a setting mode for establishing an IR control code database of the user terminal; outputting, by the first device in a second step, setting screen information through a display device linked to the first device, the setting screen information being for selecting product type and manufacturer information of the second device to be controlled by the user terminal; receiving, by the first device in a third step in response to the setting screen information in the second step, product type and manufacturer selection information of the second device selected by a user through a preset input means of the user terminal; searching, by the first device in a fourth step when the product type and manufacturer information of the second device is determined in the third step, a database for an IR code corresponding to the determined product type and manufacturer information, and extracting an IR control code set; transmitting, by the first device in a fifth step, the IR control code set extracted in the fourth step to the user terminal through the first interface; and storing, by the user terminal in a sixth step, the IR control code set received in the fifth step and establishing the IR database.

Preferably, the first step is started as a command to enter the setting mode is received from the user through the preset input means of the user terminal.

In addition, preferably, the first step is started as a link is connected through the first interface between the user terminal and the first device.

The method may further include: after the first step, transmitting, by the first device, a latest-version check request including version information of the IR database stored in a storage space of the first device, to a cloud server; determining, by the cloud server, IR database latest information by referring to the version information, and transmitting an acknowledgment signal when the IR database is of the latest version, or transmitting the latest version of the IR database to the first device when the IR database is not of the latest version; and storing, by the first device when the latest version of the IR database is received, the IR database and updating the IR database to the latest version.

Preferably, the method further includes: outputting, by the first device in a sixth step, setting screen information for selecting an IR setting code, through the display device linked to the first device; receiving, by the first device in a seventh step in response to the setting screen information in the sixth step, predetermined IR code information selected by the user through the preset input means of the user terminal; transmitting, by the first device in an eighth step, the IR code information selected by the user in the seventh step to the user terminal and requesting the user terminal to transmit an IR test signal to the second device; transmitting, by the user terminal in a ninth step, the IR test signal to the second device through IR communication according to the eighth step, the IR test signal corresponding to the IR code selected; determining, by the first device in a tenth step, an operation state of the second device according to transmission of the IR test signal of the user terminal; and setting and storing, by the user terminal in an eleventh step when it is determined that the second device operates normally as a result of determination in the tenth step, the IR code selected for controlling the second device as IR control information, and ending IR control mode setting, Preferably, the first interface is an UART, I2C, SPI, USB, or HDMI, and the second interface is an infrared communication interface.

In addition, preferably, the first interface is Bluetooth Low Energy (BLE), Zigbee®, WiFi®, or Radio Frequency for Consumer Electronics Consortium (RF4CE), and the second interface is an infrared communication interface.

According to an embodiment of the present disclosure, there is provided a user terminal connected to a first device and a second device through different communication interfaces, and configured to control the second device remotely, the user terminal including: a first interface connected to the first device to perform communication for performing a setting process for controlling the second device; a second interface connected to the second device to perform communication for controlling operation of the second device; an input part configured to receive various commands from a user; a storage; and a controller configured to perform control such that when the first device outputs setting screen information for selecting product type and manufacturer information of the second device, the product type and manufacturer information selected by the user is received through the input part and transmitted to the first device through the first interface and a control code set for controlling the second device is received from the first device through the first interface to establish an IR control code database in the storage.

Preferably, the controller is configured to perform control such that when the user gives the input part an input of entering a setting mode for control mode setting for the second device or a link to the first device is connected through the first interface, the first device is requested to enter the setting mode, through the first interface.

In addition, preferably, the controller is configured to perform control such that the latest version of a control code database is received from the first device through the first interface and a control code stored in the storage is updated.

In addition, preferably, the controller is configured to perform control such that IR code information for controlling the second device is extracted from the IR control code database stored in the storage and an IR test signal is transmitted to the second device through the second interface.

In addition, preferably, the first interface is an UART, I2C, SPI, USB, or HDMI, and the second interface is an infrared communication interface.

In addition, preferably, the first interface is BLE, Zigbee®, WiFi®, or RF4CE, and the second interface is an infrared communication interface.

According to an embodiment of the present disclosure, a control code database may be newly established and set so that a user terminal can control various peripheral devices by using an infrared (IR) blaster. Therefore, the user terminal can be used as a dedicated remote control, a control target and range of the terminal can be expanded, and the user's convenience can be increased.

In addition, according to an embodiment of the present disclosure, an IR blaster database can be more flexibly installed or updated in a user terminal, so that a dedicated remote control as well as various devices, such as PCs, laptops, and mobile terminals, can be used as remote control apparatuses.

In addition, even when a peripheral device of a new type or a new product is added, an IR blaster database can be easily installed in a user terminal, thereby achieving remote control using an IR blaster.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
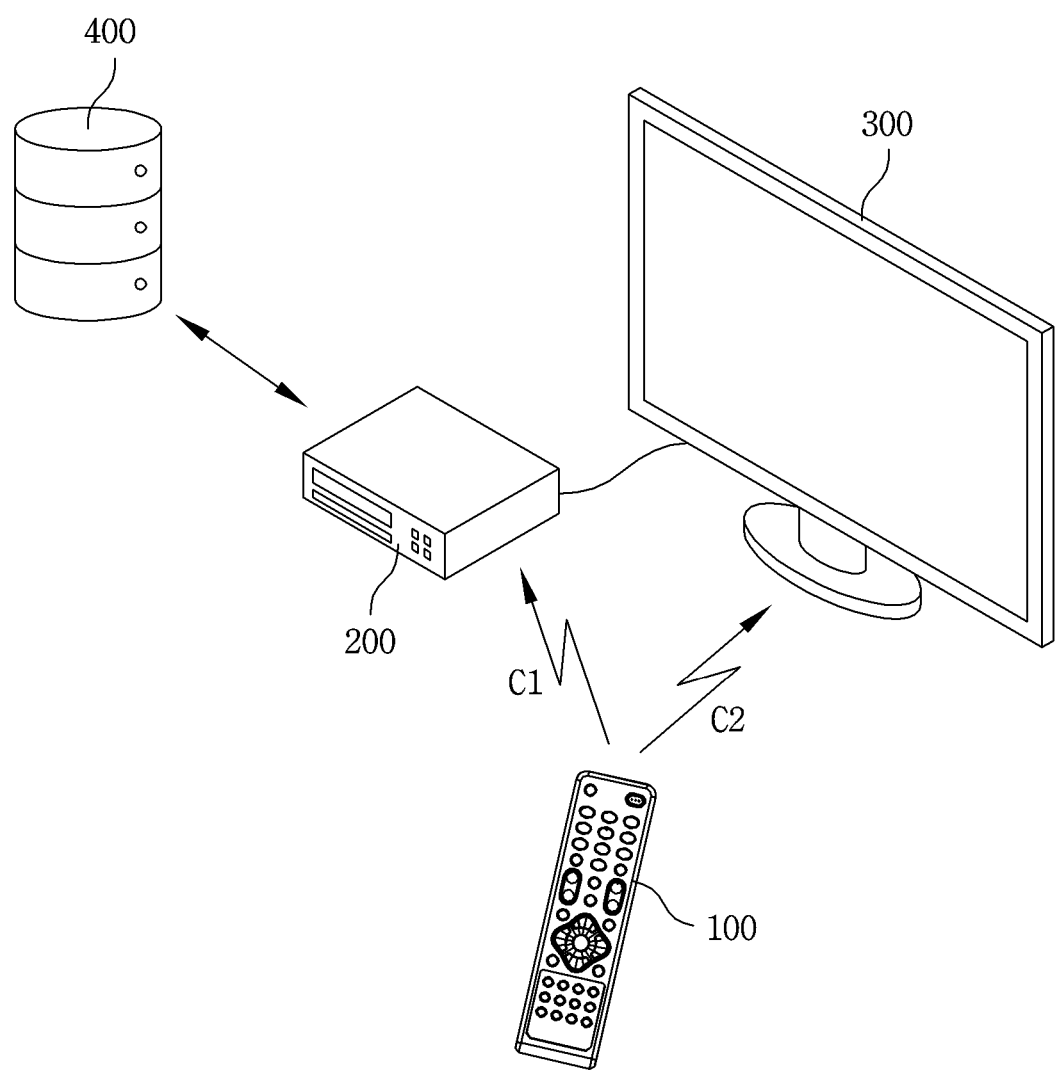
FIG. 1 is a conceptual diagram schematically showing a remote control system according to a first exemplary embodiment of the present disclosure.

Hereinafter, exemplary embodiments of the present disclosure will be described in detail with reference to the accompanying drawings. First, it is to be noted that in assigning reference numerals to elements in the drawings, the same reference numerals designate the same elements throughout the drawings although the elements are shown in different drawings. In addition, in describing the present disclosure, if it is decided that a detailed description of known function or configuration related to the disclosure makes the subject matter of the disclosure unclear, the detailed description is omitted. Hereinafter, exemplary embodiments of the present disclosure will be described, but the technical idea of the present disclosure is not limited thereto, and various modifications and changes can be made by those skilled in the art without departing from the spirit and scope of the present disclosure.

FIG. 1 is a conceptual diagram schematically showing a remote control system according to a first exemplary embodiment of the present disclosure.

As shown in the drawing, the entire system includes a user terminal 100, a first device 200, a second device 300, and a cloud server 400.

The user terminal 100 includes an input means and a communication means, and may be a mobile terminal, such as a remote control, a user PC, a laptop, and a smartphone. The user terminal 100 may be any device as long as the device includes two or more communication interfaces for performing communication with the first device 200 and the second device 300, respectively, and includes predetermined information input and processing means. In this specification, the term "user terminal" 100 is used interchangeably with the term "remote control apparatus" that performs a function of controlling the second device 300 remotely, and it is noted that the remote control apparatus and the user terminal are the same.

The first device 200 is connected to the user terminal 100 and the second device 300 over respective wired or wireless communication channels. The first device 200 supports control mode setting for the user terminal 100 to control the second device 300 remotely. Examples of the first device 200 include a set-top box, a media device, a communication repeater, a PC, a laptop, a smart device, etc.

The second device 300 may correspond to various home appliances of which the operation is directly controlled by the user terminal 100 without going through the first device 200. Not limited to display devices, such as TVs, DVD players, etc., examples of the second device 300 include various home appliances, such as set-top boxes, PCs, air purifiers, refrigerators, washing machines, cooking appliances, lighting devices, air conditioners, etc.

As shown in the drawing, the user terminal 100 may perform communication with the first device 200 over a first channel C1, and may control the operation of the second device over a second channel C2.

The cloud server 400 records and stores various command code databases for the user terminal 100 to control the second device 300. The cloud server 400 may manage a plurality of control code sets as a database according to a product type and a manufacturer of the second device 300. For remote control of a desired second device 300, a user may receive the latest version of the control code from the cloud server 400 through the first device 200. The first device 200 may access the cloud server 400 through the Internet, and requests and downloads the corresponding code database.

Figure 2:
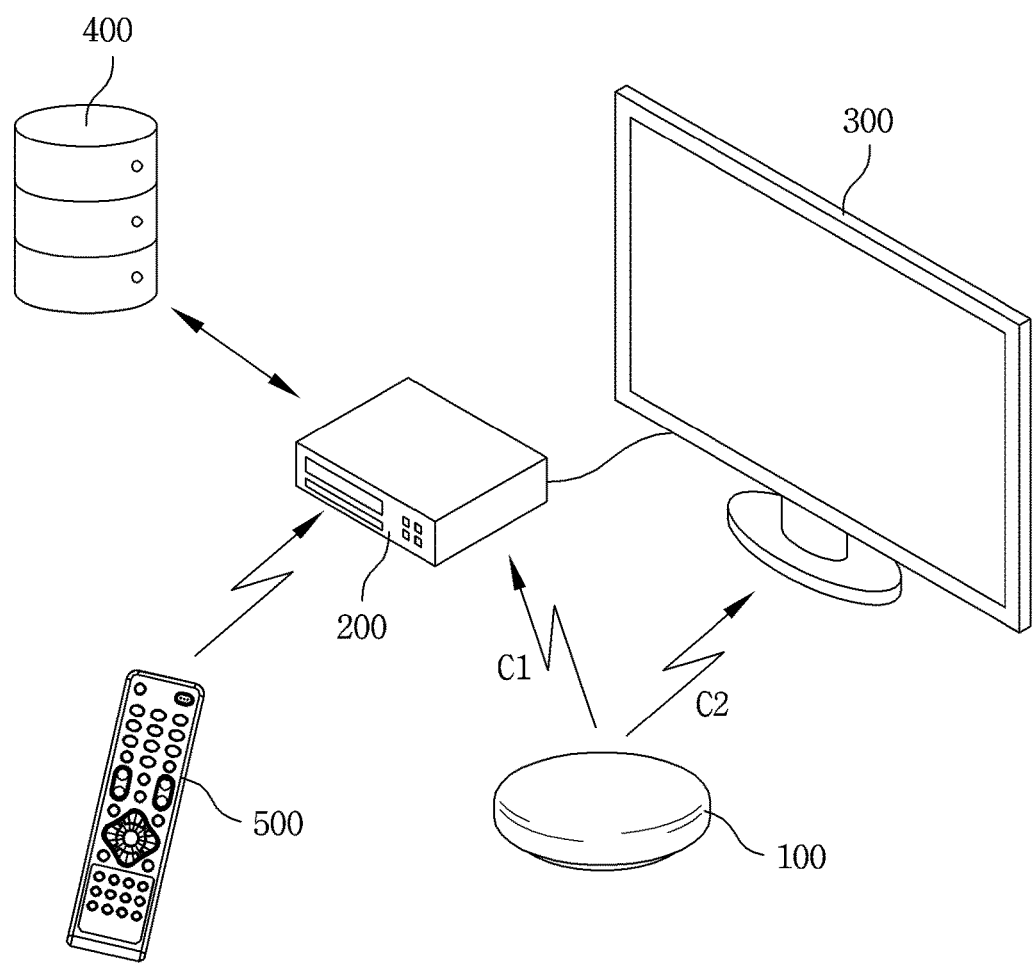
FIG. 2 is a conceptual diagram schematically showing a remote control system according to a second exemplary embodiment of the present disclosure.

FIG. 2 is a conceptual diagram schematically showing a remote control system according to a second exemplary embodiment of the present disclosure.

As shown in the drawing, the entire system includes a user terminal 100, an IR device 70, a first device 200, a second device 300, and a cloud server 400.

The user terminal 100 includes an input means and a communication means, and may be a mobile terminal, such as a remote control, a user PC, a laptop, and a smartphone. Unlike the user terminal described above with reference to FIG. 1, the user terminal 100 of the second exemplary embodiment performs communication with the first device 200 and the IR device 70 separately, and controls the second device 300 remotely through the IR device 70. Accordingly, the user terminal 100 of the second exemplary embodiment may be any device as long as the device includes two or more communication interfaces for performing communication with the first device 200 and the IR device 70, respectively, and includes predetermined information input and processing means.

The IR device 70 is a device capable of IR communication in the form of a module independent from the user terminal 100. The IR device 70 includes communication interfaces for performing communication with the user terminal 100, the first device 200, and the second device 300, respectively, and includes a processing means. In the meantime, communication between the IR device 70 and the second device 300 means remote control of the second device 300 through IR transmission. In a storage medium of the IR device 70, IR code sets for IR control of various second devices are stored as a database. Establishing and updating the IRDB of the IR device 70 may be performed through the first device 200. Controlling the second device 300 by the IR device 70 may be controlled through the user terminal 100. The IR device 70 does not include a user input means. A user command or confirmation required for an IR setting process of the IR device 70 may be input through the user terminal 100. When IR setting is completed, the IR device 70 is controlled through the user terminal 100, so that various second devices 300 are subjected to IR control. However, the IR device 70 may include a dedicated input means for entering an IR setting mode.

The first device 200 is connected to the user terminal 100, the IR device 70, and the second device 300 over respective wired or wireless communication channels. The first device 200 supports control mode setting for the IR device 70 to control the second device 300 remotely. Examples of the first device 200 include a set-top box, a media device, a communication repeater, a PC, a laptop, a smart device, etc.

The second device 300 may correspond to various home appliances of which the operation is directly controlled by the IR device 70 without going through the first device 200. Not limited to display devices, such as TVs, DVD players, etc., examples of the second device 300 include various home appliances, such as set-top boxes, PCs, air purifiers, refrigerators, washing machines, cooking appliances, lighting devices, air conditioners, etc.

As shown in the drawing, the IR device 70 may perform communication with the first device 200 over a first channel C1, and may control the operation of the second device over a second channel C2.

The cloud server 400 records and stores various command code databases for the IR device 100 to control the second device 300. The cloud server 400 may manage a plurality of control code sets as a database according to a product type and a manufacturer of the second device 300. For remote control of a desired second device 300, a user may receive the latest version of the control code from the cloud server 400 through the first device 200. The first device 200 may access the cloud server 400 through the Internet, and requests and downloads the corresponding code database.

Hereinafter, the configuration of the user terminal 100 will be described in more detail.

Figure 3:
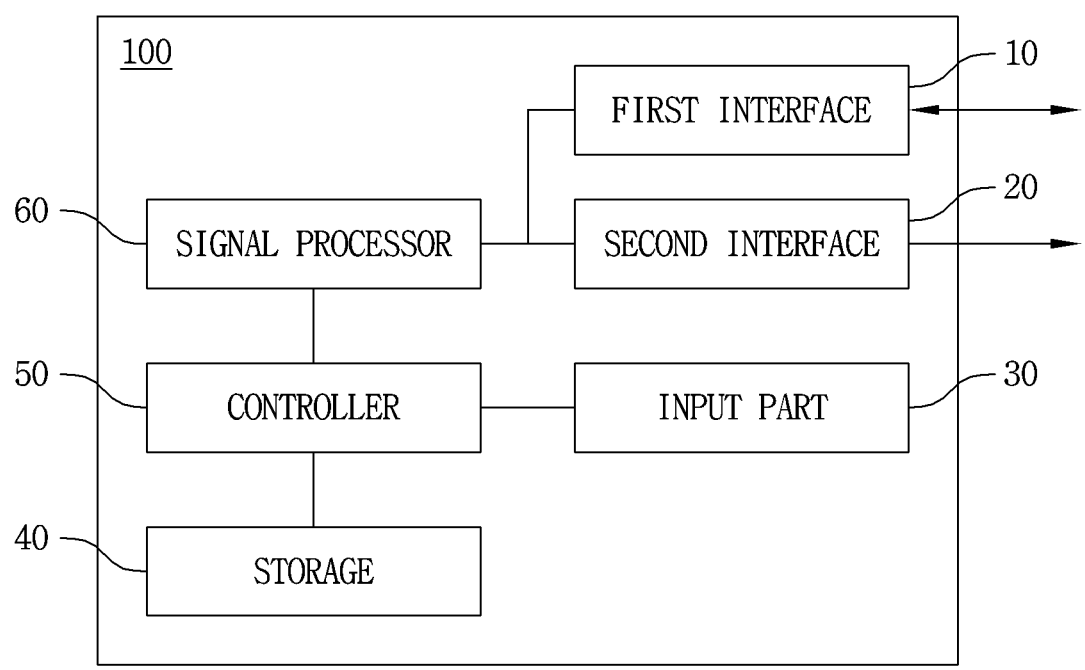
FIG. 3 is a block diagram schematically showing a configuration of a remote control apparatus according to an embodiment of the present disclosure.

FIG. 3 is a block diagram schematically showing a configuration of a user terminal according to an embodiment of the present disclosure.

According to the embodiment, the user terminal 100 includes a first interface 10, a second interface 20 for controlling the operation of the second device 300, an input part 30, a storage 40, a controller 50, and a signal processor 60.

According to the embodiment, the user terminal 100 is connected to the first device 200 and the second device 300 through different communication interfaces, and may control the second device 300 remotely through the second interface 20.

The first interface 10 is a communication interface for performing bidirectional communication with the first device 200. The first interface 10 is capable of wired or wireless transmission and reception of various types of signals and data. The first interface 10 is connected to the first device 200 to perform communication for performing a setting process for controlling the second device 300.

For example, the first interface 10 may be provided as a wired interface such as a universal asynchronous receiver/transmitter (UART), I2C, a serial peripheral interface (SPI), a universal serial bus (USB), or a high-definition multimedia interface (HDMI). Alternatively, the first interface 10 may be provided as a wireless interface such as Bluetooth Low Energy (BLE), Zigbee®, WiFi®, or RF4CE.

The second interface 20 is an interface that is connected to the second device 300 to perform communication for controlling the operation of the second device 300. According to an embodiment of the present disclosure, the second interface is a wireless communication interface for performing unidirectional communication with the second device 300, and may be provided as an IR communication transmitter such as an infrared (IR) blaster. In the meantime, according to another embodiment of the present disclosure, the IR device 70 may be provided independent of the user terminal 100 so as to perform IR communication with the second device 300 through the IR device 70. In this case, the function of the second interface 20 of the user terminal 100 is performed by the IR device 70.

The input part 30 is a means for receiving various commands from a user, and may be a keypad, a touch pad, or a voice recognition means. In the case of a general-purpose remote control, a user command may be input by using a predetermined key input button, and a user command may be input by using a volume up/down key or a channel up/down key.

The storage 40 stores therein a program for performing various functions of the user terminal 100. In the meantime, a control code for controlling the second device 300 does not exist in the storage 40 in the beginning. Through a process of establishing a control code database, which will be described later, an IR control code set is received from the first device later, thereby establishing an IR database for controlling the second device 300.

The signal processor 60 performs signal processing on various types of signals and data for performing communication with the first device 200 and the second device 300 so that communication with the first device 200 and the second device 300 is performed through the first interface 10 or the second interface 20.

The controller 50 may perform control such that a predetermined command is received from a user through the input part 30 and is subjected to predetermined signal processing. That is, the controller 50 may perform control such that a user command, such as entering a setting mode, is received through the input part 30 and is subjected to predetermined signal processing and a result is transmitted to the first device 200 through the first interface 10, or such that a signal is received from the first device 200 through the first interface 10. In addition, control may be performed such that a control code for controlling the second device 300 is extracted among control codes stored in the storage 40 and is transmitted to the second device 300 through the second interface 20.

In addition, the controller 50 performs control such that when a user gives the input part 30 an input of entering a setting mode for control mode setting for the second device 300, the first device 200 is requested to enter the setting mode, through the first interface 10.

In addition, control is performed such that when the first device 200 outputs setting screen information for selecting product type and manufacturer information of the second device 300, the product type and manufacturer information is selected and input by a user through the input part 30 and is transmitted to the first device 200 through the first interface 10. Alternatively, control may be performed such that the storage 40 is searched for a control code and identification information of at least one control code is extracted and the code identification information is transmitted to the first device 200, wherein the control code corresponds to product type and manufacturer information and is to control the second device 300.

As described above, the controller 50 may perform control such that a control code database for controlling the second device 300 is received from the first device 200 through the first interface 10 and is recorded and stored in the storage 40. That is, when a control code for controlling the second device 300 does not exist in the storage 40 of the user terminal 100, the controller 50 performs control such that a control code database for controlling the second device 300 is received from the first device 200 through the first interface 10 and the control code database is newly established in the storage 40.

Hereinafter, a process of newly configuring or updating the control code database stored in the user terminal 100 will be described with reference to FIG. 4. For convenience of description, a description will be given considering that the control code for controlling the second device 300 is an IR code, as an example. Herein, an IR code, a control code, an IR database, and an IRDB mean a command set for controlling the second device 300, and will be collectively referred to as an IRDB below for convenience.

Figure 4:
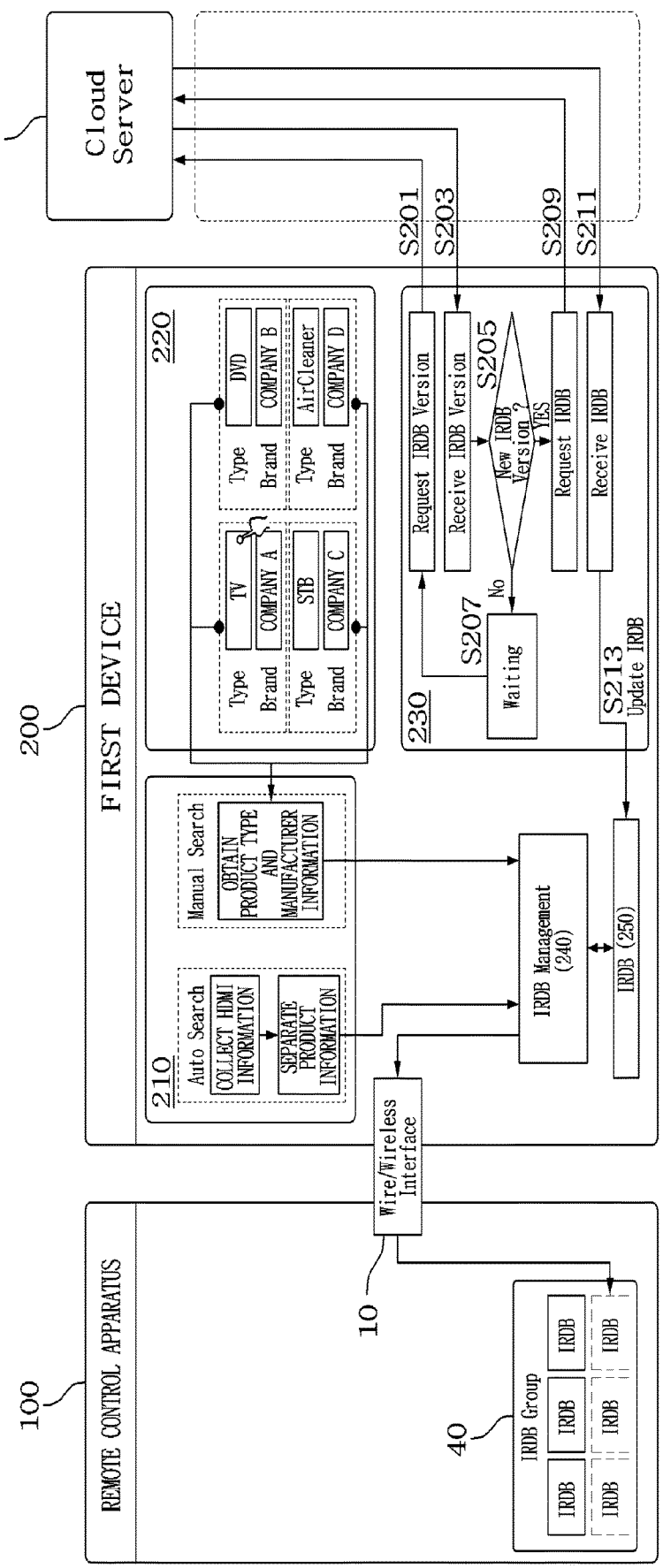
FIG. 4 is a block diagram showing a configuration and interaction of a remote control apparatus and a control device according to an embodiment of the present disclosure.

FIG. 4 is a block diagram showing a configuration and interaction of a user terminal and a device according to an embodiment of the present disclosure.

A user terminal 100 and a first device 200 are connected to each other through a wired or wireless interface 10 to perform communication with various types of signals and data for updating or newly storing an IRDB.

The user terminal 100 may include a storage 40 for recording and storing the IRDB as a database. In the storage 40, one or more IRDBs are classified according to a product type and a manufacturer and are established and stored as a database in multiple groups.

The first device 200 may be connected to the user terminal 100 through the wired or wireless interface, and may be connected to a cloud server 400 through the Internet.

The first device 200 may determine whether the user terminal 100 has an IRDB. When the user terminal 100 has an IRDB, version information of the IRDB is determined. When necessary, the latest version is downloaded from the cloud server 400 and transmitted to the user terminal 100.

The first device 200 may have its own display means or may be linked to a display of another device, and may use the display in a process of updating the IRDB.

As shown in the drawing, the first device 200 includes an IR service module 210, an IR application module 220, an IR update service module 230, an IR database 250, and an IRDB management module 240.

The IR update service module 230 makes a request to the cloud server 400 for IRDB version information in step S201. When IRDB information is received from the cloud server 400 in step S203, it is determined whether the IRDB version is the latest by referring to IRDB version information stored in the database 250 of the first device 200 in step S205.

As a result of determination in step S205, when it is determined that the latest version does not exist, a request may be made to the cloud server for IRDB version information in step S207 after waiting for a predetermined period of time.

Conversely, as a result of determination in step S205, when it is determined from the cloud server 400 that the latest version exists, in other words, when it is determined that the version information provided from the could is a new version, a request is made to the cloud server 400 for the latest version of the IRDB in step S209, the latest version of the IRDB is received in step S211, and is recorded and stored in the IR database 250 of the first device 200 in step S213.

In this way, the IR update service module 230 of the first device 200 periodically determines whether the IRDB version is the latest through communication with the cloud server 400, thereby securing an IRDB of a newly added device or an updated version of an IRDB and managing an IRDB continuously.

The IR service module 210 performs a function of automatically (auto search) or manually (manual search) determining product type and manufacturer information of the second device 300 to be controlled by the user terminal 100.

According to an embodiment of the present disclosure, when the first device 200 and the second device 300 are connected to each other through an HDMI, the first device 200 may determine the type of the second device automatically through a standardized signal, such as consumer electronics control (CEC) or extended display identification data (EDID) of HDMI.

In addition, according to another embodiment of the present disclosure, when the first device 200 configures a screen for showing the product type and manufacturer of the second device 300 and provides the screen to a user through the linked display, the user selects product type and manufacturer information of the second device through key input. In this way, the first device 200 may determine the product type and manufacturer information of the second device manually. The IR application module 220 may configure a screen menu for selecting the product type and manufacturer information of the second device as described above, and may provide the screen menu to the display. As shown in the drawing, the product type and manufacturer information of the second device is selected through various selection methods, such as a user's key input.

When the product type and manufacturer information of the second device is determined automatically or manually through the IR service module 210, the information may be transmitted to the IRDB management module 240 and the IRDB corresponding to the product and manufacturer information may be extracted from the IRDB 250. Accordingly, the first device 200 may extract the latest version of the IRDB for controlling the second device from the IRDB of the first device 200, and may transmit the latest version of the IRDB to the user terminal 100.

Figure 5:
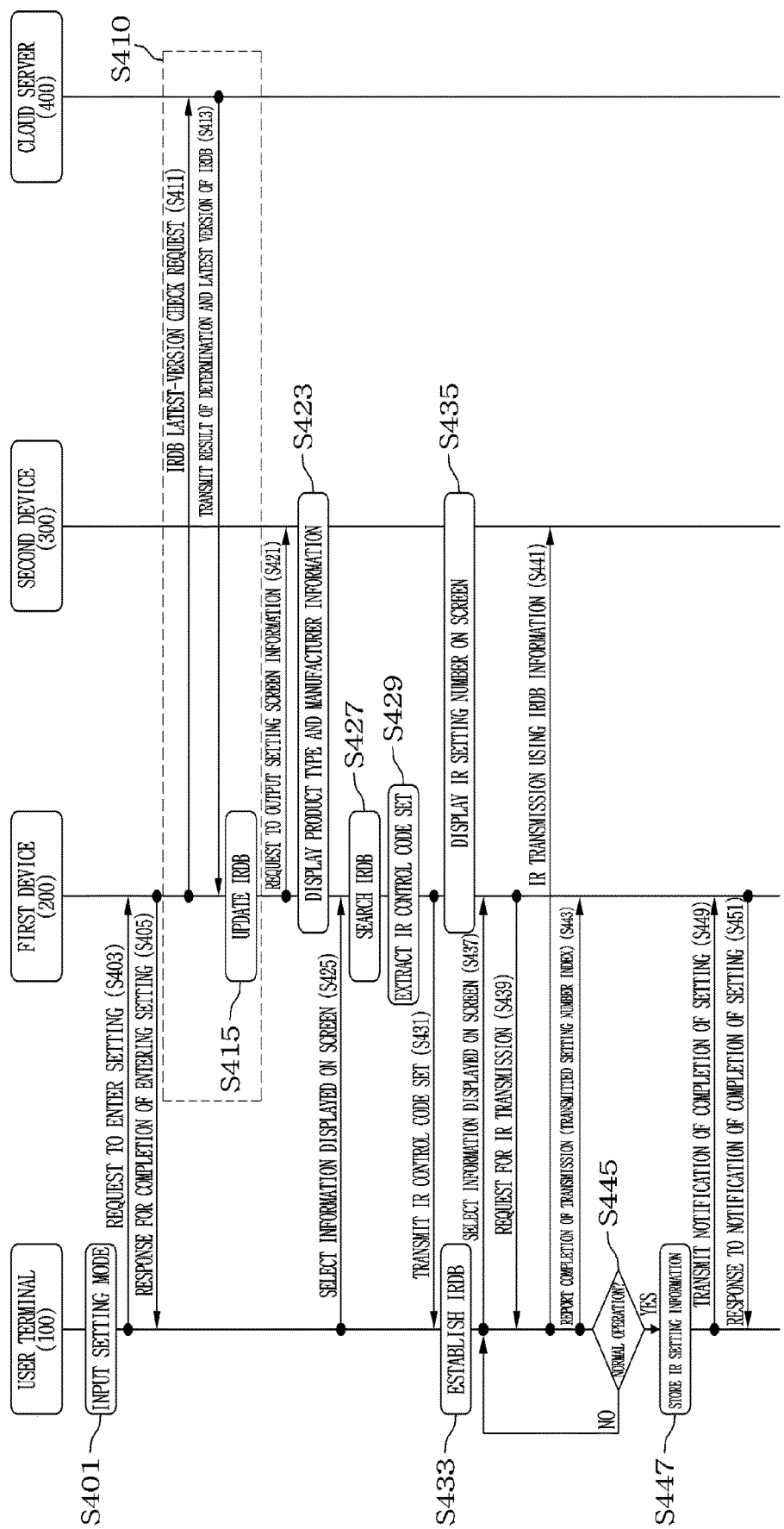
FIG. 5 is a flowchart showing a process of establishing an IR database in a user terminal and setting a peripheral device control code according to a first exemplary embodiment of the present disclosure.

FIG. 5 is a flowchart showing a process of establishing an IR database in a user terminal and setting a peripheral device control code according to a first exemplary embodiment of the present disclosure. This embodiment is an embodiment employed in the environment of the remote control system shown in FIG. 1 above.

First, a command to enter an IR setting mode is input from a user through a preset input means of the user terminal 100 in step S401. According to an embodiment of the present disclosure, the command to enter the IR setting mode may be input through the "Setup" button configured in the user terminal 100. According to another embodiment of the present disclosure, even when there is no user input, when a link through the first interface between the user terminal 100 and the first device 200 is formed, the IR setting mode may be automatically entered in step S501.

When the command to enter the setting mode is input or the communication line through the first interface is formed, the user terminal 100 transmits a request for entering the setting mode to the first device 200 for IR control mode setting, in step S403.

When the first device 200 receives the request for entering the setting mode in step S403, the first device 200 transmits a response signal to the user terminal 100 in step S405 and operates the IR service module 210, the IR application module 220, and the IR update service module 230 for IR control mode setting.

In the meantime, the first device 200 may download the latest version of the IRDB through the cloud server 400 in step S410.

That is, the first device 200 transmits a latest-version check request including version information of the IRDB stored in the database 250 of the first device 200, to the cloud server 400 in step S411. Referring to the version information, the cloud server 400 determines IRDB latest information, and transmits an acknowledgment signal when the version is the latest or transmits the latest version of the IRDB to the first device 200 when the version is not the latest version, in step S413. Afterward, the first device 200 stores the IRDB received from the cloud server 400 in the database of the first device 200 in step S415.

The process of updating the IRDB in step S410 is an option for the first device and is not necessarily performed. The process in step S410 may be performed before step S401 of inputting the setting mode by the user or after the steps described below.

In step S421, the first device 200 requests the display device linked to the first device 200 to output setting screen information for selecting product type and manufacturer information of the second device 300 to be controlled by the user terminal 100. In response to the request, the second device 300 displays the setting screen information for selecting the product type and manufacturer information in step S423.

In this embodiment, the second device 300 is a TV, and the first device 200 may request the screen of the second device 300 to output the screen information.

Afterward, the first device 200 receives product type and manufacturer selection information of the second device 300 from the user through the preset input means of the user terminal 100 in step S425. Step S425 will be described in detail with reference to FIG. 9.

Figure 9:
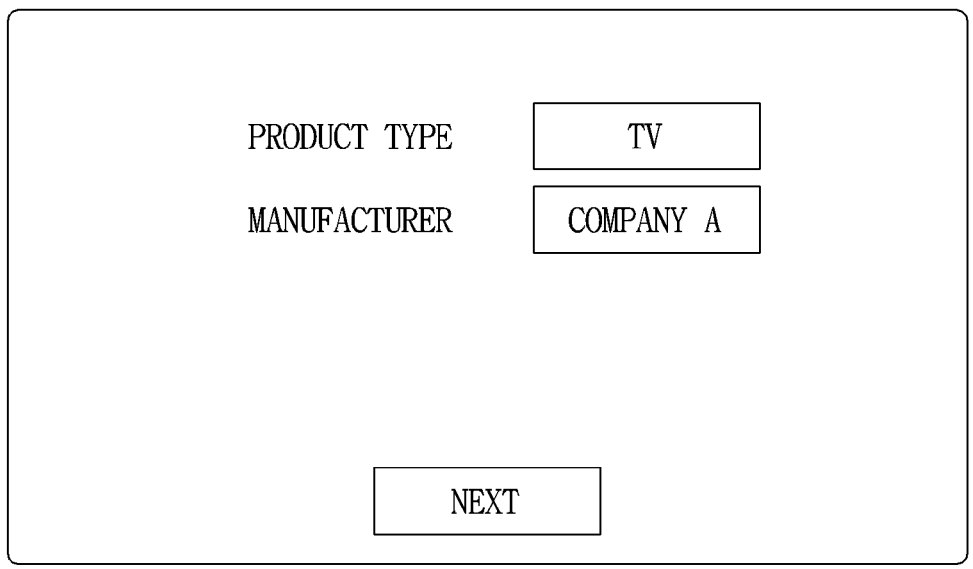
FIG. 9 is a reference diagram showing a screen for selecting product type and manufacturer information for setting a control code of a user terminal according to an embodiment of the present disclosure.

FIG. 9 is a reference diagram showing a screen for selecting product type and manufacturer information for setting an IRDB of a user terminal according to an embodiment of the present disclosure. Referring to FIG. 9, the screen may be configured such that the user selects "TV" as a product type and "Company A" as a manufacturer. That is, the user does not input text manually, but selects appropriate product type and manufacturer information by using the "Next" menu button from a list of multiple items.

When the product type and manufacturer information of the second device 300 is determined in step S425, the first device 200 searches the IRDB for an IR code corresponding to the information in step S427, and extracts an IR control code set corresponding to the product type and the manufacturer in step S429.

Afterward, the extracted IR control code set is transmitted to the user terminal 100 through the first interface in step S431.

The user terminal 100 stores the IR control code set received in step S431 in the storage to establish an IR database in step S433. Through this, a basis for performing a control function such as a dedicated remote control may be established.

The user terminal in which the IRDB is established performs an IR test for controlling the second device 300 in the IRDB through steps S437 to S451 afterward, and through this, the setting of the IR code is finally completed. An IR code setting process through performing an IR test will be described below in more detail.

In the IRDB received from the first device 200, a plurality of IR codes corresponding to product type and manufacturer information of the second device 300 may exist. For example, if a total of five IR codes exist, indexes, such as IR #1, IR #2, IR #3, IR #4, and IR #5, are configured as IDs and respective IR tests may be performed.

The first device 200 outputs identification information setting screen information for selecting a plurality of pieces of IR code identification information (ID) through the display device linked to the first device 200, in step S435.

Figure 10:
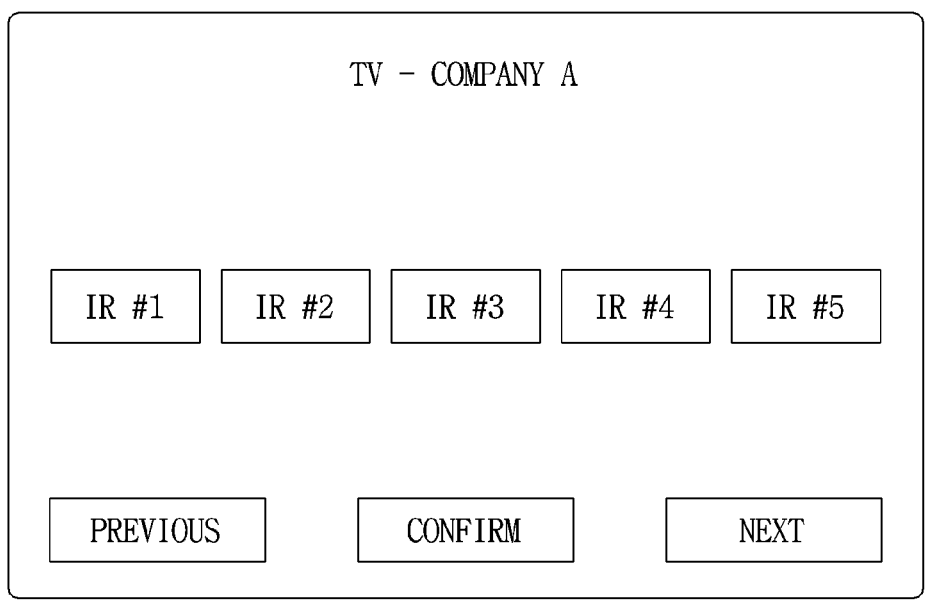
FIG. 10 is a reference diagram showing a screen for selecting IR setting number information for setting a control code of a user terminal according to an embodiment of the present disclosure.

FIG. 10 is a reference diagram showing a screen for selecting IR setting number information for setting an IR control code according to an embodiment of the present disclosure. As described above, if a total of five IR codes are detected as an IR code matched to product type and manufacturer information of the second device, the list of IR #1, IR #2, IR #3, IR #4, and IR #5 is output on the screen, and the user chooses the command menus "Previous", "Confirm", and "Next" displayed at the lower part of the screen through key input to select an index that the user wants.

In this way, in response to the setting screen information in step S435, the first device 200 receives particular identification information selected by the user from the plurality of pieces of IR code identification information (ID) through the preset input means of the user terminal 100 in step S437.

The first device 200 transmits the IR code information selected by the user in step S437 to the user terminal 100 and requests the user terminal 100 to transmit an IR test signal to the second device 300 in step S439.

In response to the request signal, the user terminal 100 extracts, from the IRDB, the IR test signal corresponding to the selected IR code according to step S439 and transmits the IR test signal to the second device 300 through IR communication in step S441.

Afterward, the user terminal 100 transmits the IR-transmitted ID or index information to the first device 200 to report that IR transmission to the second device 300 has been performed, in step S443.

Then, the user terminal 100 determines whether the second device 300 operates normally according to IR transmission in step S445. According to an embodiment of the present disclosure, whether the second device 300 operates normally may be determined by receiving, through the user, operation state information of the second device according to transmission of the IR test signal.

As a result of determination in step S445, when the user inputs the fact that the second device 300 does not operate, steps S437 to S443 are repeated. Herein, proceeding back to step S437 takes place and the identification information different from the previously selected identification information is selected from the plurality of pieces of IR code identification information (ID) to perform IR transmission.

Conversely, as a result of determination in step S445, when it is determined that the second device 300 operates normally, the user terminal 100 sets and stores the IR code selected for controlling the second device 300 as IR control information in step S447.

Afterward, the user terminal 100 transmits a notification of completion of IR setting for IR control to the first device 200 in step S449, receives a response thereto from the first device 200 in step S451, and ends IR control mode setting.

Afterward, the user terminal 100 may control the second device 300 through the second interface directly by using the set IR code.

Figure 6:
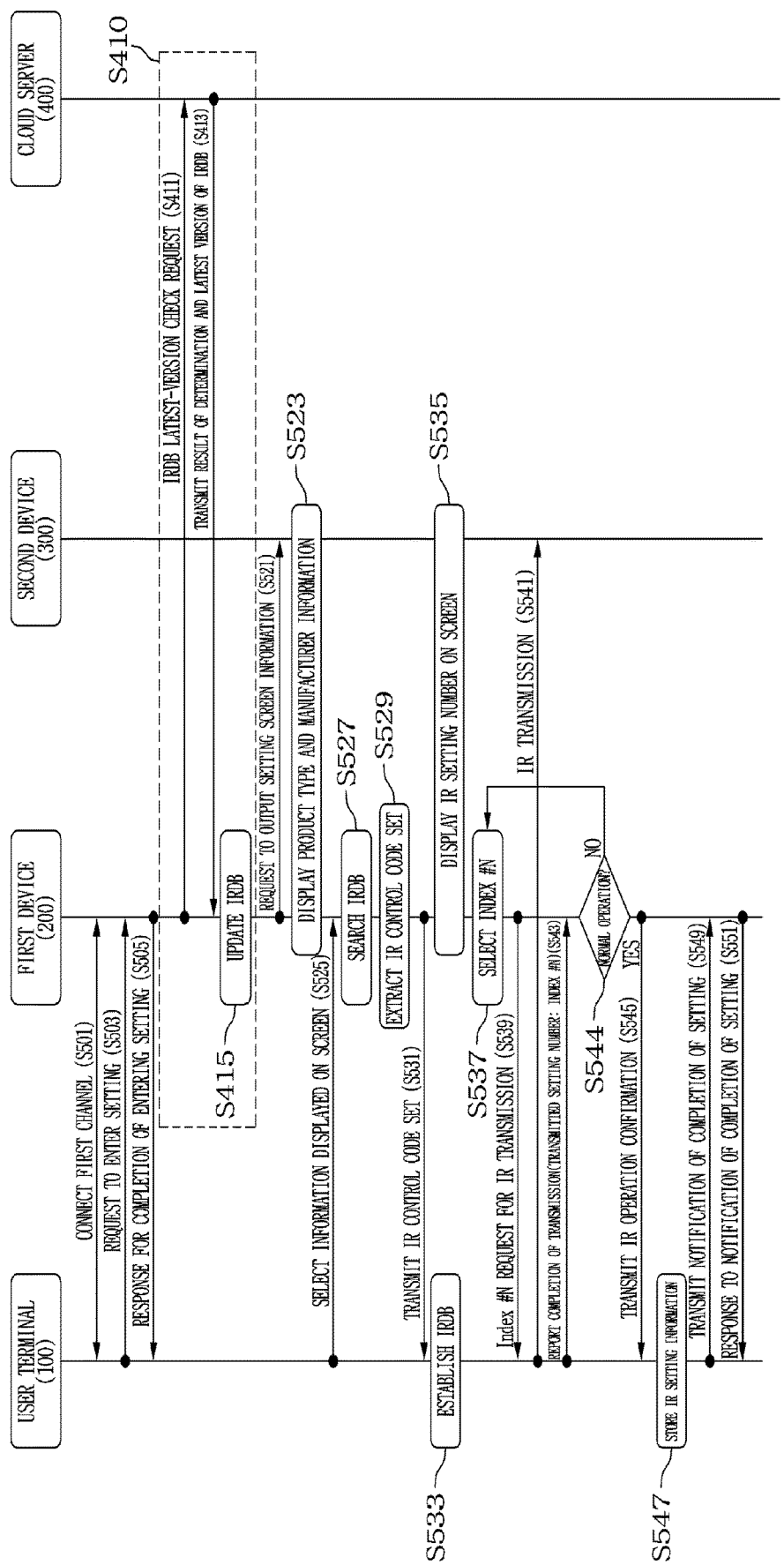
FIG. 6 is a flowchart showing a process of establishing an IR database in a user terminal and setting a peripheral device control code according to a second exemplary embodiment of the present disclosure.

FIG. 6 is a flowchart showing a process of establishing an IR database in a user terminal and setting a peripheral device control code according to a second exemplary embodiment of the present disclosure. This embodiment is another embodiment employed in the environment of the remote control system shown in FIG. 1 above.

In the embodiment shown in FIG. 6, steps S501 to S535 are the same as those of the above-described embodiment shown in FIG. 4, and thus a detailed description thereof will be omitted and step S537 and the subsequent steps will be described in detail.

First, in step S535, the first device 200 outputs identification information setting screen information for selecting a plurality of pieces of IR code identification information (ID) through the display device linked to the first device 200.

FIG. 10 is a reference diagram showing a screen for selecting IR setting number information for setting an IR control code of the user terminal 100 according to an embodiment of the present disclosure. As described above, if a total of five IR codes are detected as an IR code matched to product type and manufacturer information of the second device, the list of IR #1, IR #2, IR #3, IR #4, and IR #5 is output on the screen, and the user chooses the command menus "Previous", "Confirm", and "Next" displayed at the lower part of the screen through key input to select an index that the user wants.

In this way, in response to the setting screen information in step S535, the first device 200 receives particular identification information selected by the user from the plurality of pieces of IR code identification information (ID) through the preset input means of the user terminal 100.

In the embodiment shown in FIG. 6, the first device 200 may select particular identification information automatically even when the user does not select identification information. That is, the order may be preset such that the first IR identification information "IR #1" among the IR indexes shown in FIG. 10 is first selected in step S537.

The first device 200 transmits the IR code information selected in step S537 to the user terminal 100 and requests the user terminal 100 to transmit an IR test signal to the second device 300 in step S539.

In response to the request signal, the user terminal 100 extracts, from the IRDB, the IR test signal corresponding to the IR code selected by the first device 200 according to step S539 and transmit the IR test signal to the second device 300 through IR communication in step S541.

Afterward, the user terminal 100 transmits the IR-transmitted ID or index information to the first device 200 to report that IR transmission to the second device 300 has been performed, in step S543.

The first device 200 determines whether the second device 300 operates normally according to IR transmission by the user terminal 100 in step S544. According to an embodiment of the present disclosure, the first device 200 may determine whether the second device 300 operates normally according to the IR test signal transmitted by the user terminal 100 through the link connected to the second device 300.

Alternatively, according to another embodiment of the present disclosure, whether the second device 300 operates normally may be determined by receiving, through the user, operation state information of the second device according to transmission of the IR test signal.

As a result of determination in step S544, when it is determined that the second device 300 does not operate, steps S537 to S543 are repeated. Herein, proceeding back to step S537 takes place and the identification information different from the previously selected identification information is selected from the plurality of pieces of IR code identification information (ID) to perform IR transmission. That is, the first device 200 selects the identification information "IR #2" following the identification information "IR #1" previously selected, and notifies the user terminal 100 of this. The user terminal 100 transmits the IR signal corresponding to "IR #2" to the second device 300.

Conversely, as a result of determination in step S544, when it is determined that the second device 300 operates normally, the first device 200 transmits an IR operation confirmation to the user terminal 100 in step S545.

When the user terminal 100 receives an acknowledgment signal of the normal operation of the second device 300 from the first device, the user terminal 100 sets and stores the IR code selected for controlling the second device 300 as IR control information in step S547.

Afterward, the user terminal 100 transmits a notification of completion of IR setting for IR control to the first device 200 in step S549, receives a response thereto from the first device 200 in step S551, and ends IR control mode setting.

Afterward, the user terminal 100 may control the second device 300 through the second interface directly by using the set IR code.

Figure 7:
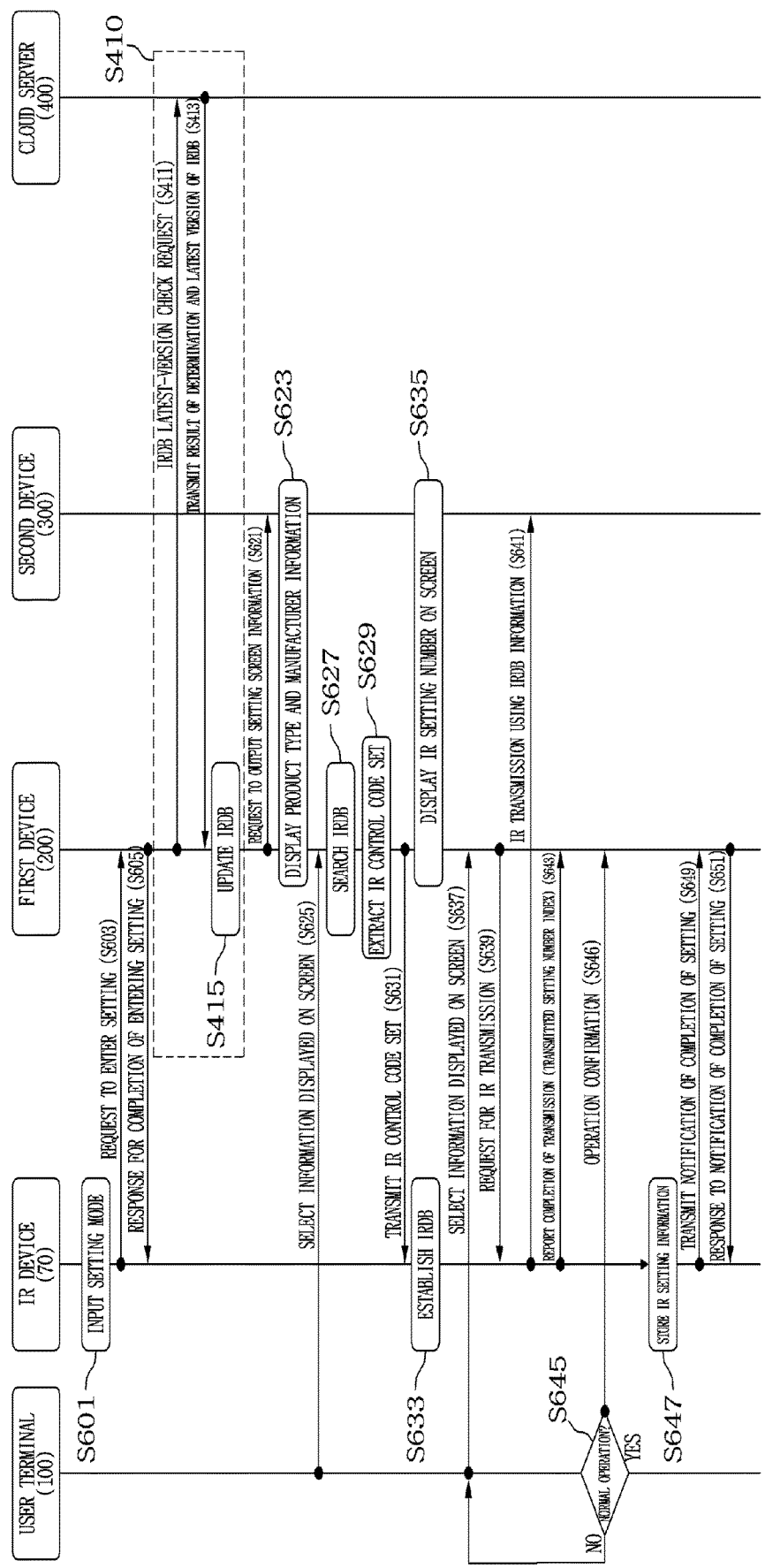
FIG. 7 is a flowchart showing a process of establishing an IR database in a user terminal and setting a peripheral device control code according to a third exemplary embodiment of the present disclosure.

FIG. 7 is a flowchart showing a process of establishing an IR database in a user terminal and setting a peripheral device control code according to a third exemplary embodiment of the present disclosure. This embodiment is an embodiment employed in the environment of the remote control system shown in FIG. 2 above.

In this embodiment, remote control of the second device 300 is performed through the IR device 70, and thus, an IRDB is established in the storage medium of the IR device 70 rather than the user terminal.

First, a command to enter the IR setting mode is input from a user through a preset input means of the IR device 70 in step S601. According to an embodiment of the present disclosure, the command to enter the IR setting mode may be input through a dedicated input means, for example, the "Setup" button, configured in the IR device 70. According to another embodiment of the present disclosure, even when there is no user input, when a link through the first interface between the IR device 70 and the first device 200 is formed, the IR setting mode may be automatically entered in step S601.

When the command to enter the setting mode is input or the communication link through the first interface is formed, the IR device 70 transmits a request for entering the setting mode to the first device 200 for IR control mode setting, in step S603.

When the first device 200 receive the request for entering the setting mode in step S603, the first device 200 transmits a response signal to the IR device 70 in step S605 and operates the IR service module 210, the IR application module 220, and the IR update service module 230 for IR control mode setting.

In the meantime, the first device 200 may download the latest version of the IRDB through the cloud server 400 in step S410.

That is, the first device 200 transmits a latest-version check request including version information of the IRDB stored in the database 250 of the first device 200, to the cloud server 400 in step S411. Referring to the version information, the cloud server 400 determines IRDB latest information, and transmits an acknowledgment signal when the version is the latest or transmits the latest version of the IRDB to the first device 200 when the version is not the latest version, in step S413. Afterward, the first device 200 stores the IRDB received from the cloud server 400 in the database of the first device 200 in step S415.

The process of updating the IRDB in step S410 is an option for the first device and is not necessarily performed. The process in step S410 may be performed before step S401 of inputting the setting mode by the user or after the steps described below.

In step S621, the first device 200 requests the display device linked to the first device 200 to output setting screen information for selecting product type and manufacturer information of the second device 300 to be controlled by the IR device 70. In response to the request, the second device 300 displays the setting screen information for selecting the product type and manufacturer information in step S623

In this embodiment, the second device 300 is a TV, and the first device 200 may request the screen of the second device 300 to output the screen information.

Afterward, the first device 200 receives product type and manufacturer selection information of the second device 300 from the user through the preset input means of the user terminal 100 in step S625. That is, the IR device 70 does not have an input means, so various user commands and inputs may be processed using the user terminal 100. Step S625 will be described in detail with reference to FIG. 9.

FIG. 9 is a reference diagram showing a screen for selecting product type and manufacturer information for setting an IRDB of a user terminal according to an embodiment of the present disclosure. Referring to FIG. 9, the screen may be configured such that the user selects "TV" as a product type and "Company A" as a manufacturer. That is, the user does not input text manually, but selects appropriate product type and manufacturer information by using the "Next" menu button from a list of multiple items.

When the product type and manufacturer information of the second device 300 is determined in step S625, the first device 200 searches the IRDB for an IR code corresponding to the information in step S627, and extracts an IR control code set corresponding to the product type and the manufacturer in step S629.

Afterward, the extracted IR control code set is transmitted to the IR device 70 through the first interface in step S631.

The IR device 70 stores the IR control code set received in step S631 in the storage to establish an IR database in step S633. Through this, a basis for performing a control function such as a dedicated remote control may be established.

The IR device in which the IRDB is established performs an IR test for controlling the second device 300 in the IRDB through steps S637 to S651 afterward, and through this, the setting of the IR code is finally completed. An IR code setting process through performing an IR test will be described below in more detail.

In the IRDB received from the first device 200, a plurality of IR codes corresponding to product type and manufacturer information of the second device 300 may exist. For example, if a total of five IR codes exist, indexes, such as IR #1, IR #2, IR #3, IR #4, and IR #5, are configured as IDs and respective IR tests may be performed.

The first device 200 outputs identification information setting screen information for selecting a plurality of pieces of IR code identification information (ID) through the display device linked to the first device 200, in step S635.

FIG. 10 is a reference diagram showing a screen for selecting IR setting number information for setting an IR control code according to an embodiment of the present disclosure. As described above, if a total of five IR codes are detected as an IR code matched to product type and manufacturer information of the second device, the list of IR #1, IR #2, IR #3, IR #4, and IR #5 is output on the screen, and the user chooses the command menus "Previous", "Confirm", and "Next" displayed at the lower part of the screen through key input to select an index that the user wants.

In this way, in response to the setting screen information in step S635, the first device 200 receives particular identification information selected by the user from the plurality of pieces of IR code identification information (ID) through the preset input means of the user terminal 100 in step S637.

The first device 200 transmits the IR code information selected by the user in step S637 to the IR device 70 and requests the IR device 70 to transmit an IR test signal to the second device 300 in step S639.

In response to the request signal, the IR device 70 extracts, from the IRDB, the IR test signal corresponding to the selected IR code according to step S639 and transmits the IR test signal to the second device 300 through IR communication in step S641.

Afterward, the IR device 70 transmits the IR-transmitted ID or index information to the first device 200 to report that IR transmission to the second device 300 has been performed, in step S643.

Then, the user determines whether the second device 300 operates normally according to IR transmission in step S645. According to an embodiment of the present disclosure, whether the second device 300 operates normally may be determined by receiving, through the user terminal 100, operation state information of the second device according to transmission of the IR test signal.

As a result of determination in step S645, when the user inputs the fact that the second device 300 does not operate, steps S637 to S643 are repeated. Herein, proceeding back to step S637 takes place and the identification information different from the previously selected identification information is selected from the plurality of pieces of IR code identification information (ID) to perform IR transmission.

Conversely, as a result of determination in step S645, when it is determined that the second device 300 operates normally, the IR device 70 sets and stores the IR code selected for controlling the second device 300 as IR control information in step S647.

Afterward, the IR device 70 transmits a notification of completion of IR setting for IR control to the first device 200 in step S649, receives a response thereto from the first device 200 in step S651, and ends IR control mode setting.

Afterward, the user may control the IR device 70 through the user terminal 100, and may control the second device 300 through the second interface directly by using the IR code set in the IR device 70.

Figure 8:
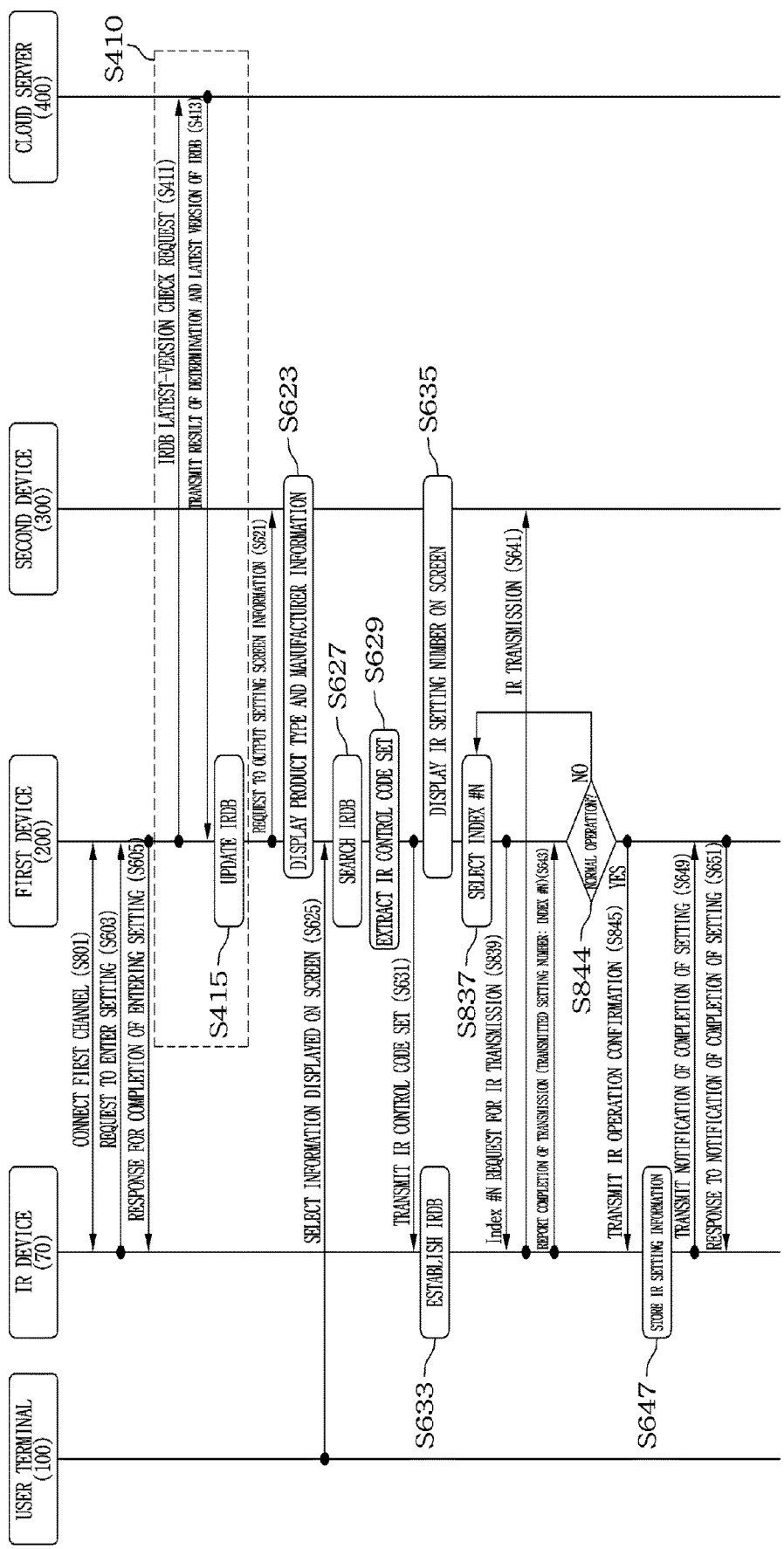
FIG. 8 is a flowchart showing a process of establishing an IR database in a user terminal and setting a peripheral device control code according to a fourth exemplary embodiment of the present disclosure.

FIG. 8 is a flowchart showing a process of establishing an IR database in a user terminal and setting a peripheral device control code according to a fourth exemplary embodiment of the present disclosure. This embodiment is another embodiment employed in the environment of the remote control system shown in FIG. 2 above.

In the embodiment shown in FIG. 8, steps S601 to S635 are the same as those of the above-described embodiment shown in FIG. 7, and thus a detailed description thereof will be omitted and step S837 and the subsequent steps will be described in detail.

First, in step S635, the first device 200 outputs identification information setting screen information for selecting a plurality of pieces of IR code identification information (ID) through the display device linked to the first device 200.

FIG. 10 is a reference diagram showing a screen for selecting IR setting number information for setting an IR control code of the user terminal 100 according to an embodiment of the present disclosure. As described above, if a total of five IR codes are detected as an IR code matched to product type and manufacturer information of the second device, the list of IR #1, IR #2, IR #3, IR #4, and IR #5 is output on the screen, and the user chooses the command menus "Previous", "Confirm", and "Next" displayed at the lower part of the screen through key input to select an index that the user wants.

In this way, in response to the setting screen information in step S635, the first device 200 receives particular identification information selected by the user from the plurality of pieces of IR code identification information (ID) through the preset input means of the user terminal 100.

In the embodiment shown in FIG. 8, the first device 200 may select particular identification information automatically even when the user does not select identification information. That is, the order may be preset such that the first IR identification information "IR #1" among the IR indexes shown in FIG. 10 is first selected in step S837.

The first device 200 transmits the IR code information selected in step S837 to the IR device 70 and requests the IR device 70 to transmit an IR test signal to the second device 300 in step S839.

In response to the request signal, the IR device 70 extracts, from the IRDB, the IR test signal corresponding to the IR code selected by the first device 200 according to step S839 and transmits the IR test signal to the second device 300 through IR communication in step S641.

Afterward, the IR device 70 transmits the IR-transmitted ID or index information to the first device 200 to report that IR transmission to the second device 300 has been performed, in step S643.

The first device 200 determines whether the second device 300 operates normally according to IR transmission by the IR device 70 in step S844. According to an embodiment of the present disclosure, the first device 200 may determine whether the second device 300 operates normally according to the IR test signal transmitted by the IR device 70 through the link connected to the second device 300.

Alternatively, according to another embodiment of the present disclosure, whether the second device 300 operates normally may be determined by receiving, through the user, operation state information of the second device according to transmission of the IR test signal.

As a result of determination in step S844, when it is determined that the second device 300 does not operate, steps S837 to S643 are repeated. Herein, proceeding back to step S837 takes place and the identification information different from the previously selected identification information is selected from the plurality of pieces of IR code identification information (ID) to perform IR transmission. That is, the first device 200 selects the identification information "IR #2" following the identification information "IR #1" previously selected, and notifies the IR device 70 of this. The IR device 70 transmits the IR signal corresponding to "IR #2" to the second device 300.

Conversely, as a result of determination in step S844, when it is determined that the second device 300 operates normally, the first device 200 transmits an IR operation confirmation to the IR device 70 in step S845.

When the IR device 70 receives an acknowledgment signal of the normal operation of the second device 300 from the first device, the IR device 70 sets and stores the IR code selected for controlling the second device 300 as IR control information in step S647.

Afterward, the IR device 70 transmits a notification of completion of IR setting for IR control to the first device 200 in step S649, receives a response thereto from the first device 200 in step S651, and ends IR control mode setting.

Afterward, the user may control the IR device 70 through the user terminal 100, and may control the second device 300 through the second interface directly by using the IR code set in the IR device 70.

Although all elements constituting the embodiments of the present disclosure have been described as being integrated into a single one or as operating as a single one, the present disclosure is not necessarily limited to the embodiments. That is, within the object and the scope of the present disclosure, all of the elements may be selectively integrated into one or more parts and operate. In addition, each of the elements may be realized as independent hardware. Alternatively, some or all of the elements may be selectively combined and realized as a computer program having a program module that performs some or all functions combined in one or more pieces of hardware. The computer program may be stored in a computer-readable recording medium, such as a USB memory, a CD disk, a flash memory, etc., and read and executed by a computer, whereby the embodiments of the present disclosure are realized. Examples of the computer-readable recording medium may include magnetic recording media, optical recording media, and carrier wave media.

Unless otherwise defined in the detailed description, all terms used here including technical or scientific terms have the same meanings as the terms generally understood by those skilled in the art to which the present disclosure pertains. Terms commonly used, such as those defined in dictionaries, should be interpreted as having meanings identical to contextual meanings of the related art, and should not interpreted as having ideal or excessively formal meanings unless explicitly defined in the present disclosure.

The above description is merely intended to exemplarily describe the technical idea of the present disclosure, and those skilled in the art will appreciate that various changes and modifications are possible without departing from the essential features of the present disclosure. Therefore, the embodiments disclosed in the present disclosure and the accompanying drawings are not intended to limit the technical idea of the present disclosure and are merely intended to describe the present disclosure, and the scope of the present disclosure is not limited by those embodiments and the drawings. The protection scope of the present disclosure should be defined by the accompanying claims, and the technical idea of all equivalents thereof should be construed as being included in the scope of the present disclosure.

What is claimed is:

1. A method of establishing an IR database of a user terminal, wherein the user terminal is connected to a first device through a first interface and to a media device through a second interface and is configured to control the media device by using an infrared (IR) blaster, the method comprising:

starting, by the first device in a first (a) step, a setting mode for establishing an IR control code set corresponding to the media device in the user terminal;

receiving, by the first device in a first (b) step, a recent version database comprising a plurality of IR control code sets for a plurality of different models and manufacturers of consumer media devices, wherein each IR control code set includes infrared control codes for the user terminal to control a specific model and manufacturer of a media device through infrared communication, from an external server, each IR control code set corresponding to different target devices to be controlled, outputting, by the first device in a second step, setting screen information on a display device linked to the first device, the setting screen information being for selecting product type and manufacturer information of the media device to be controlled by the user terminal;

receiving, by the first device in a third step in response to the setting screen information in the second step, product type and manufacturer selection information of the media device selected by a user through a preset input means of the user terminal;

searching, by the first device in a fourth step, the recent version database to extract an IR code set corresponding to the product type and manufacturer information from the IR data, and extracting the IR code set, wherein, when multiple IR control code sets corresponding to the product type and manufacturer are found the fourth step comprises displaying the multiple IR control code sets on the display device for the user to select one of the multiple IR control code sets to be extracted;

transmitting, by the first device in a fifth step, the extracted IR control code set to the user terminal through the first interface; and storing, by the user terminal, the IR control code set in the IR database.

2. The method of claim 1, wherein the first (a) step is started as a command to enter the setting mode is received from the user through the preset input means of the user terminal.

3. The method of claim 1, wherein the first (a) step is started as a link is connected through the first interface between the user terminal and the first device.

4. The method of claim 1, further comprising:

outputting, by the first device in a sixth step, setting screen information for selecting an IR setting code, through the display device linked to the first device;

receiving, by the first device in a seventh step in response to the setting screen information in the sixth step, predetermined IR code selection information selected by the user through the preset input means of the user terminal;

transmitting, by the first device in an eighth step, IR code information selected by the user in the seventh step to the user terminal and requesting the user terminal to transmit an IR test signal to the media device;

transmitting, by the user terminal in a ninth step, the IR test signal to the media device through IR communication according to the eighth step, the IR test signal corresponding to the IR code selected;

determining, by the first device in a tenth step, operation state information of the media device according to transmission of the IR test signal of the user terminal; and setting and storing, by the user terminal in an eleventh step when it is determined that the media device operates normally as a result of determination in the tenth step, the IR code selected for controlling the media device as IR control information, and ending IR control mode setting.

5. The method of claim 1, wherein the first interface is an UART, I2C, SPI, USB, or HDMI, and the second interface is an infrared communication interface.

6. The method of claim 1, wherein the first interface is BLE, Zigbee®, WiFi®, or RF4CE, and the second interface is an infrared communication interface.

7. The method of claim 1, further comprising:
when the product type and manufacturer selection information of the media device is not selected by the user, selecting, by the first device in a twelfth step, one of the plurality of IR control code sets, and
transmitting, by the first device in a thirteenth step, the selected IR control code set to the user terminal for a control test with the media device,
repeating the twelfth and thirteenth steps with a different IR control conde set until the control test with the media device succeeds.

* * * * *